(12) United States Patent
Kakivaya et al.

(10) Patent No.: US 7,493,313 B2
(45) Date of Patent: Feb. 17, 2009

(54) DURABLE STORAGE OF .NET DATA TYPES AND INSTANCES

(75) Inventors: Gopala K. R. Kakivaya, Sammamish, WA (US); Savithri N. Dani, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 10/944,634

(22) Filed: Sep. 17, 2004

(65) Prior Publication Data

US 2006/0064425 A1    Mar. 23, 2006

(51) Int. Cl.
*G06F 17/30* (2006.01)
(52) U.S. Cl. ............... 707/3; 707/1; 707/10; 707/102; 707/103 R; 704/7; 704/9
(58) Field of Classification Search ............. 707/103 R, 707/102, 3, 1, 10, 100; 704/7, 9
See application file for complete search history.

(56) References Cited

U.S. PATENT DOCUMENTS

| | | | | |
|---|---|---|---|---|
| 5,809,266 | A * | 9/1998 | Touma et al. | 715/764 |
| 5,878,411 | A | 3/1999 | Burroughs et al. | 707/4 |
| 6,243,709 | B1 * | 6/2001 | Tung | 707/103 R |
| 6,453,310 | B1 * | 9/2002 | Zander | 707/1 |
| 6,487,558 | B1 * | 11/2002 | Hitchcock | 707/200 |
| 6,601,233 | B1 * | 7/2003 | Underwood | 717/102 |
| 6,701,514 | B1 * | 3/2004 | Haswell et al. | 717/115 |
| 6,834,285 | B1 * | 12/2004 | Boris et al. | 707/103 R |
| 7,013,298 | B1 * | 3/2006 | De La Huerga | 707/3 |
| 7,222,066 | B1 * | 5/2007 | Oon | 704/9 |
| 2002/0120630 | A1 * | 8/2002 | Christianson et al. | 707/103 R |
| 2005/0091671 | A1 * | 4/2005 | Deem et al. | 719/328 |
| 2005/0108684 | A1 * | 5/2005 | Sohn et al. | 717/120 |
| 2005/0278709 | A1 * | 12/2005 | Sridhar et al. | 717/136 |

FOREIGN PATENT DOCUMENTS

EP    1241589 A2    9/2002

OTHER PUBLICATIONS

Title: DB2 Universal Database for iSeries Author: Brian Smith, Veronica Chatfield, and Ohki Uemura Date: Oct. 31, 2001 Publisher: IBM Edition: v5r1 Pertinent pp. 33 (section "Create Table") <publib.boulder.ibm.com/iseries/v5r1/ic2924/info/rzahf/rzahfms1.htm>.*

(Continued)

*Primary Examiner*—Hosain T Alam
*Assistant Examiner*—Syling Yen
(74) *Attorney, Agent, or Firm*—Workman Nydegger

(57) ABSTRACT

A generic mechanism to persist data objects into databases without a fundamental dependence on the underlying data store is provided. Rather than relying on the expertise of a programmer to know what the structure of a database should look like, data types are defined and adorned by the programmer with attributes that suggest what the corresponding data will be used for, and without the programmer defining the structure of the database that will be used to store the data. Thereafter, the database is dynamically created to satisfy the needs suggested by the adorned attributes. In particular, a number of different tables are created according to the intended needs for accessing the data. By doing this an optimized database can be created to provide the desired results without requiring the programmer to have any specific knowledge regarding databases and corresponding database schemas.

44 Claims, 4 Drawing Sheets

OTHER PUBLICATIONS

"High Performance Large Object Database," *Research Disclosure*, vol. 42, No. 421, May 1, 1999, Havant, UK, article No. 421123.
Niyomthum, Kobchai, et al., "A Transformation from an Object Database to an Object Relational Database," *Proceedings IEEE SoutheastCon 2003*, St. Ann, Jamaica WI, Apr. 4-6, 2003, pp. 7-11.
D. Dabbene et al., "Adding Persistence to Objects Using Smart Pointers", Journal of Object-Oriented Programming, vol. 8, Issue 3, Jun. 1995, pp. 33-39.
P. Fitsillis et al., "Producing Relational Database Schemata from an Object Oriented Design", Proceedings of Twentieth Euromicro Conference, System Architecture and Integration, Sep. 1994, pp. 251-257.
O.E. Oroy et al., "Managed Objects Made Persistent", GLOBECOME 1999: Seamless Interconnection for Universal Service, Global Telecommunications Conference, Dec. 1999, pp. 825-830.

* cited by examiner

Album Table *100a*

| Record Number | Title | Album Art | Artist |
|---|---|---|---|
| 1 | Album 1 Title | Art | Collection ID1 |
| 2 | Album 2 Title | Art | Collection ID2 |
| 3 | Album 3 Title | Art | Collection ID3 |
| ⟩130a | ⟩110a | ⋮ ⟩120a | ⟩140a |
| Y | Album N Title | Art | Collection ID N |

*Fig. 1A*

Song Table *100b*

| Record Number | Title | Duration | Album |
|---|---|---|---|
| 11 | Song Title 1 | Time a | Album 1 Title |
| 12 | Song Title 2 | Time a | Album 1 Title |
| 13 | Song Title 3 | Time a | Album 1 Title |
| ⟩140b | ⟩110b | ⋮ ⟩120b | ⟩130b |
| X | Song Title Y | Time n | 3 |

*Fig. 1B*

Artist Table *100c*

| Record Number | Title | Picture | URI |
|---|---|---|---|
| 21 | Artist Name 1 | Picture Data 1 | URI Data 1 |
| 22 | Artist Name 2 | Picture Data 2 | URI Data 2 |
| 23 | Artist Name 3 | Picture Data 3 | URI Data 3 |
| ⟩140c | ⟩110c | ⋮ ⟩120c | ⟩130c |
| Z | Artist Name 4 | Picture Data 4 | URI Data 4 |

*Fig. 1C*

Collections Table 100d

| Collection ID | Element ID |
|---|---|
| Collection ID 1 | Artist Element ID 21 |
| Collection ID 1 | Artist Element ID 22 |
| Collection ID 2 | Artist Element ID 23 |
| 110d | 120d |
| Collection ID N | Artist Element ID N |

*Fig. 1D*

Customer Table 200a

| Name | Phone Number | Address |
|---|---|---|
| Name 1 | Phone Number 1 | Address 1 |
| Name 2 | Phone Number 2 | Address 2 |
| Name 3 | Phone Number 3 | Address 3 |
| 210a | 220a | 230a |
| Name N | Phone Number N | Address N |

*Fig. 2A*

Purchase Order Table 200b

| Customer | Item Description | Barcode SKU ID |
|---|---|---|
| Phone Number 1 | Item Data 1 | Code Data 1 |
| Phone Number 2 | Item Data 2 | Code Data 2 |
| Phone Number 3 | Item Data 3 | Code Data 3 |
| 210b | 220b | 230b |
| Phone Number N | Item Data N | Code Data N |

*Fig. 2B*

DURABLE STORAGE OF .NET DATA TYPES AND INSTANCES

BACKGROUND OF THE INVENTION

1. The Field of the Invention

The present invention relates to the field of computing systems and, more particularly, to methods, systems and computer program products for creating database structures and for storing data in a database in response to adornments associated with data types, particularly .Net datatypes.

2. Background and Relevant Art

There are many different systems and tools that can be used to store data. Data storage can include, for example, the use of database tools that are configured to enable a programmer to select different types of database structures for storing data based on perceived needs. One such tool includes Access, although others also exist, which stores data according to a Jet SQL database. It will be appreciated, however, that notwithstanding this example, various other types of data storage tools exist for many different types of relational databases.

One problem with existing database tools, however, is that they require programmers to have a relatively sophisticated knowledge about databases and how the database should be created and organized in order to provide the best known performance for the specific implementation they are being created for. For example, a programmer will need to identify the different types of tables, allocated memory and other storage structures to be provided for the database.

However, inasmuch as the needs for stored data can fluctuate, the existing paradigm for creating database structures is somewhat limited. In particular, the creation of databases based on the known needs for storing the data and a programmers limited knowledge about how to best serve those needs, might unduly restrict the use of the database and prevent the database from being easily customized to serve different needs in the future.

In particular, a database may be needed to store different types of data from different systems that are not previously known or compatible with the established database at the time the database is created. The established database structures may also need to provide flexibility to be used for different types of relational databases, besides just SQL. Existing techniques, however, do not provide this flexibility without having to rewrite the monolithic code defining the database.

Yet another problem encountered with storing objects into relational databases is the difficultly for programmers to translate class hierarchies while storing the objects into the relational databases and in such a way as to not negatively affect the performance of the storage when the data objects are accessed at a later time. For example, if many different types of classes correspond to the same base class, it may not make sense to store each of the separate classes in a single monolithic database structure. Likewise, it may not make sense to store each of the separate classes entirely separately in different structures. Both of these examples can create inefficiency problems during subsequent querying of the data.

Accordingly, what is needed is a generic way to store arbitrary data structures and to retrieve them on demand and without a fundamental dependence on the underlying structure of the data store.

BRIEF SUMMARY OF THE INVENTION

The present invention is generally related to methods, systems, and computer program products that offer a generic mechanism to persist data objects into databases and without a fundamental dependence on the underlying data store or its rules or features. Instead, the present invention provides a paradigm shift in data storage techniques. In particular, rather than relying on the expertise of a programmer to know what the structure of a database should look like to obtain desired results, the present invention focuses on what the data will be used for and thereafter creates an optimized database to provide the desired results.

According to one embodiment, data types are defined and adorned by a programmer with attributes that suggest what the corresponding data will be used for, and without the programmer defining the structure of the database that will be used to store the data. Thereafter, the database is dynamically created to satisfy the needs suggested by the adorned attributes. In particular, a number of different tables are created according to the intended needs for accessing the data. According to some embodiments, the database structures and tables are created in such a way as to minimize duplicating data storage and to increasing the performance of the database to satisfy the intended needs to access the data. This creation of the database tables is transparent to the programmer who does not need to have any special knowledge regarding the different types of data structures or databases. Instead, the programmer can develop code that merely identifies data types based on the known needs to access the corresponding data.

If at a later time the needs to access the data change, the data types can be modified or deleted and new data types can be created, which will permit the underlying structure of the database to be dynamically updated accordingly and without requiring a monolithic piece of code corresponding to the database to be modified throughout. In other words, the present invention provides means for enabling modular creation of database structures.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 1A, 1B, 1C and 1D illustrates a set of type tables that can be created in one specific implementation, according to the adornments attached to the corresponding data types;

FIGS. 2A and 2B illustrate another set type tables that can be created in one specific implementation, according to the adornments attached to the corresponding data types;

DETAILED DESCRIPTION OF THE PREFERRED EMBODIMENTS

Figure 3:
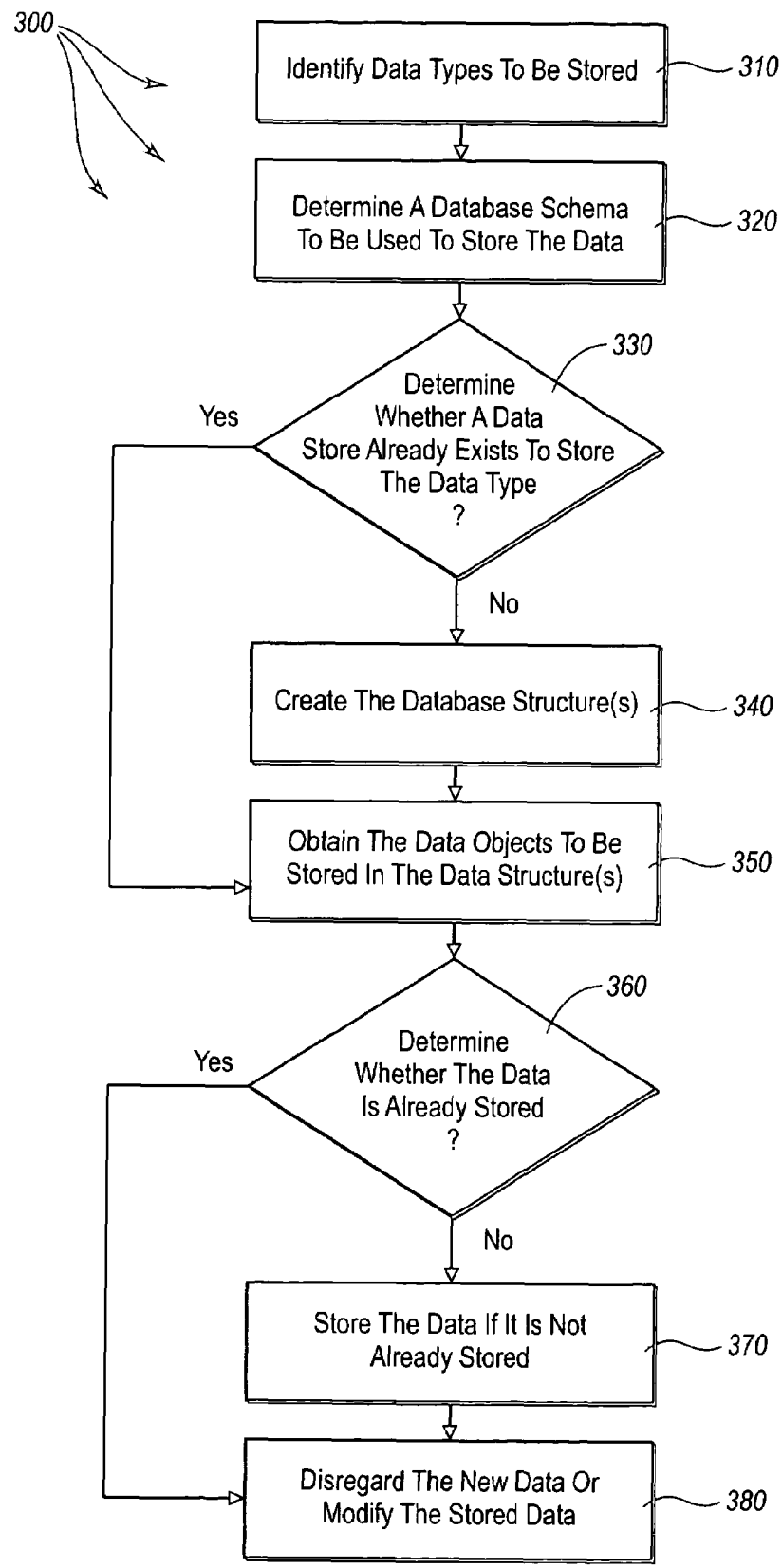
FIG. 3 illustrates a flowchart corresponding to methods for storing data according to one embodiment of the invention.

The present invention extends to both methods and systems for storing data and for creating corresponding database structures. The embodiments of the present invention may comprise a special purpose or general-purpose computer including various computer hardware, as discussed in greater detail below.

As described herein, embodiments of the invention include methods in which data types are adorned with attributes based on intended use for the data and without requiring any special knowledge regarding how the database structures will be created to store the data. Appropriate database storage tables are then created according to the needs as determined by the adorned data types. The tables can then be populated with corresponding data and queried by appropriate applications. It will be appreciated that because the creation of the database structures are based on the intended use of the data, and exclusive of any knowledge requirement of databases, the database structures are created to optimize the performance of the database regardless of any lack of knowledge the programmer may have regarding databases and database structures. It will also be appreciated that this represents a paradigm shift and improvement over the prior art systems for creating database structures.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Durable Storage for .NET Data Types and Instances

According to one embodiment of the invention a durable storage for .NET Data Types and Instances is provided with corresponding modules to enable the creation of database structures, such as, but not limited to databases tables, in response to adornments that are placed on data types defined during programming.

The adornments that are placed on the data types can vary according to any need or desire. Some examples will now be provided to illustrate how adornments can be attached to data types in code segments written by a programmer, and in such a way that they can later be used to control the creation of database structures, even though the programmer does not have any special knowledge regarding the database structures that will subsequently be created.

In a first example, albums are described as a class type that includes a title, album art, a list of artists and a list of songs. Each of the songs are also identified as a class type having a title, a duration and an album. Finally, the artist is identified as a class type that includes a name, a picture and a fan page URI.

```
class Album {
    string title;
    byte[ ] albumArt;
    // The following unadorned collection field indicates that a given
    // artist can be referenced by many albums and a given album can
    refer to many artists. In database terms, this
    // is a Many:Many relationship.
    Artist[ ] artists;
    // The CLSIBackPointer attribute on the following field indicates
    // that song collection is owned by the album instance and that
    // the album field in Song type serves as the back pointer to the
    // owning album. In database terms, this is a 1:Many relationship.
    [CLSIBackPointer(album)]
    Song[ ] songs;
}
class Song {
    // The CLSIIndex attribute on the following field indicates that
    // it should be indexed for query efficiency.
    [CLSIIndex]
    string title;
    int duration;
    // The following field serves as the back pointer referenced by
    // the songs collection in the Album type above. In database
    // terms, this is a primary foreign key.
    Album album;
}
class Artist {
    // The CLSIIndex attribute on the following field indicates that
    // it should be indexed for query efficiency.
    [CLSIIndex]
    string Name;
    byte[ ] picture;
    Uri fanPage;
}
```

As further reflected by the foregoing example, some of the data objects corresponding to class types are adorned with special attributes. For example, the [CLSIBackPointer(album)] attribute indicates that the album field or object comprises a back pointer to many different songs that can be associated with the same album. This will be described in more detail with reference to FIG. 1, below.

Another adornment that is shown includes the [CLSIIndex] attribute associated with the artist class, which indicates it should be able to be queried. One reason for this adornment is to increase the performance of the database. In particular, if it known that the database will permit querying of certain terms, it can be useful to indicate which terms are intended to be queried. This way, when the data structures are created, they can be created in such a way as to optimize searching for the terms that are known to be queried, as described below in more detail.

Attention is now directed to FIGS. 1A-1D, which illustrate certain database structures comprising database tables that can be created according to methods of the invention, and based on the data types and adornments defined in the code that is provided to the durable storage modules.

As shown four tables have been created. A first table, Album Table 100a corresponds to the album type identified in the example above, and includes title fields 110a and art fields 120a, along with a record number column 130a and an artist column 140a, referred to below. These different fields correspond to the objects provided in the code described above.

A separate Song Table 100b also includes corresponding fields (110b, 120b, 130b) for titles, duration and album, respectively, as defined by the code. The duration field 120b can include any time duration data corresponding to the song it belongs to.

An Artist Table 100c includes a name field 110c, a picture field 120c, and a URI field 130c corresponding to the description of the artist class type in the example provided above. The picture field 120c can include a pointer to a graphic image corresponding to the artist, for example, and the URI field 130c can include a link to a document or web page corresponding to the artist, such as a fan page.

Finally, collections table 100d is provided, that includes two columns both typed to hold unique identities. The first column 110d represents the identity of the collection and is pointed to by the fields of instances referencing it, in this case albums from the album table 100a. The second column 120d represents the identity of an instance that is part of the collection, in this case artists. Thus, a single collection will have as many rows in the collection table as the number of instances it contains, but all such rows have the same unique identity identifying the given collection. Accordingly, pointer fields to collections can be represented by placing a unique identity of the row representing the collection instance. This implies that the each distinct artists collection pointed to by the album object will be represented in the collection table as one or more rows with the second column of each row pointing to a row in the artist table. For instance, in the present example, collection ID 1 (which is associated with album 1) is linked to artist element 21 and artist element 23. The collection IDs are also identified in the Album Table 100a for cross-reference.

When the name field of the artist type is attributed as a unique identifier, with appropriate adornments, as described above, the artist name can represent a unique identity in the collections table that can point to rows in the artist table. However, if the name field of the artist type is not attributed as a unique identifier, the pointer will instead point back to the identifiers of the corresponding artist table, instead of the artist name. In the present example, this is done using the record number.

It will be appreciated that because the title field of the song class and the name field of the artist class types were adorned with the [CLSIIndex] attribute, the database structures (e.g., tables) corresponding to the song and artist classes are built in such a way that they can be sorted and quickly queried on the title and name columns respectively, and without requiring the database to query all of the rows stored in the corresponding database tables.

A database table associated with a given class might include hidden record numbers 130a, 140b, 140c, for example, that provide a unique identifier for each row in the table.

During searching for a term or object, the database might sequentially search through all records based on the record numbers 130a. However, if a class field has previously been identified and adorned with an attribute, such as the [CLSIIndex] attribute, indicating that it is intended to be queried, then a corresponding index data structure can be created on the columns corresponding to the attributed fields, such as the title column of the song table and Name column of the artist table so that they can be sorted (alphabetically, or in any other manner) to optimize the searching. Accordingly, querying can be optimized, and without the programmer having to build the data structure through any special knowledge about databases.

Likewise, the back pointer adornment associated with the songs field in the album class indicates that song collection is owned by the album instance and that the album field in the song type serves as the back pointer to the owning album. Accordingly, the songs belonging to a give album can be identified by querying the song table with the album column identifying the specified album. Conversely, the album column can be used to identify the album to which a given songs belongs to. Thereafter, the identified album can be used to identify other information corresponding to the artists of the album using other tables (e.g., 100c).

In this manner, the song table 100b can be queried independently of the album table 100a, such that the album table 100a does not have to store the duration information about each of the songs listed in the song table 100b. It will be appreciated that this can improve performance when querying the album table 100a. Likewise, querying of the song table 100b is also optimized by not having to store all of the art and artist name information associated with the album to which it belongs. This is because cross-referencing of the tables can easily provide all of the necessary information.

Another example will now be provided with respect to customers of purchase orders to show yet additional types of adornments. Nevertheless, it will be appreciated that this example, as well as the foregoing example, are merely illustrative and should not, therefore, be construed as limiting the invention with regards to the types of database structures that can be created or the types of adorning attributes that can be used.

In the following example, a customer and purchase order classes are created.

```
class Customer {
    // The CLSIIndex attribute on the following field indicates that
    // it should be indexed for query efficiency.
    [CLSIIndex]
    string name;
    // The CLSIIdentity attribute on the following field indicates
    // that it serves as an identity field for this type. In database
    // terms, this field is a unique key for this type
    [CLSIIdentity]
    string phoneNumber;
    // The CLSISingleRef attribute on the following field indicates
    // that only it can reference the address instance. In database
    // terms, it implies a 1:1 relationship between customer and
    // address instances
    [CLSISingleRef]
    Address address;
    // The CLSIBackPointer attribute on the following field indicates
    // that orders collection is owned by the customer instance and
    // that the customer field in PurchaseOrder type serves as the
    // back pointer to the owning customer instance. In database
    // terms, this is a 1:Many relationship
    [CLSIBackPointer(customer)]
    PurchaseOrder[ ] orders;
}
```

-continued

```
class PurchaseOrder {
    // The following field serves as the back pointer referenced by
    // the orders collection field in the customer type above. In
    // database terms, this is a protected foreign key
    Customer customer;
    string itemDescription;
    int skuID;
}
abstract class Address {
    string street;
    string city;
}
class USAddress : Address {
    string state;
    int zip;
}
```

In the foregoing example, some new adornments are presented. For example, adorning the phone number field of the customer class, a [CLSIIdentity] attribute is provided to indicate that the phone number should represent a unique key for the customer type.

A [CLSISingleRef] attribute is also provided to the address field of the customer class to indicate that it is intended that a one to one relationship exist between a customer and a customer's address.

Another attribute, comprising [CLSIBackPointer(customer)] is adorned on the purchase order field of the customer class. This attribute indicates that it is intended that the purchase orders server as back pointers to the customers making the orders. This can be understood more clearly in view of the examples provided in FIG. 2.

As shown in FIGS. 2A and 2B, a customer table 200a and a purchase order table 200b are created along with their corresponding fields (210a, 220a, 230a) and (220a, 220b, 230b), respectively, which are defined above in the illustrative code segment. These tables 200a and 200b were also created, as were the tables 100a, 100b and 100c, according to the definitions and adornments provided in the code segments, and without any special knowledge regarding how database structures are built. Instead, the definitions and adornments merely need to provide hints as to what the stored data will be used for, or how it will need to be accessed or queried.

In the foregoing example, the adornment of a [CLSIIdentity] attribute is provided to indicate that the corresponding field, phone number, should represent a unique key for the customer type. This can be useful, for example to minimize the requirement of storing a special record number 130a (FIG. 1) for each row in a table. In particular, the field adorned with the [CLSIIdentity] attribute can be used as the unique identifier for each corresponding row. This is shown in FIG. 2 where the phone numbers 220a are used to represent the customers in the purchase order table 200b.

In other embodiments, a combination of fields can also be adorned with the [CLSIIdentity] attribute, such that the combination of fields can represent the unique identifier for a row.

The [CLSISingleRef] attribute, identified above, is also provided to the address field of the customer class to indicate that it is intended that a one to one relationship exist between a customer and a customer's address. In this regard, a customers address field 230a can be populated with the actual address string corresponding to the customer or can alternatively point to the address data stored in another table.

The back pointer attribute, [CLSIBackPointer(customer)], generally described above, was also adorned on the purchase order field for the customer class type in the last example.

Accordingly, as described in reference to FIG. 1, the back pointer enables the customer listed in the purchase order table to reference back to the customer table 200a. Accordingly, it is not necessary that a single table maintain each of the data items corresponding to a customer as well as the customer's purchase orders. Instead, the detailed description of the item being purchased and the corresponding SKU code can be maintained separately from the customer table 200a and accessed, when needed, by looking up the customer corresponding to the purchase order. It will be appreciated that this can improve the performance of the database according to the intended needs of the database, as described above. Even more importantly, the programmer did not have to know or understand how the database tables would be created. Instead, the programmer merely needs to know what the intended use of the data is.

The foregoing example also illustrates how the class types can be arranged into different hierarchies. In particular, the foregoing example identifies an address base class and a US address class that corresponds to the address base class. This can be useful, for example, to create separate tables or other database structures that can store relevant data corresponding to the different hierarchal classifications.

Although tables are not currently illustrated for the address classes, it can be imagined how a generic base class table can be created for addresses that will include different columns for storing generic address information that is common to many different types of addresses, such as state, street name, address number, etc. Subclasses can then be stored in specialized tables or other structures that include more specific address data that may not be relevant for all addresses. For example, in a world wide directory application, not all nationalities will include zip codes. Likewise, addresses in United States may not include the address codes and other information associated with foreign addresses. In such situations, each of the different regional address tables can include specialized information that is not relevant for all address objects, and while still enabling quick access to generic address information from the base class table.

As in the previous examples regarding cross referencing, it will also be appreciated that the base class tables (e.g., base address class table) can be cross-referenced with subclass tables (e.g., regional class tables). This technique can be utilized to create hierarchal levels of various depths between class and sub-class tables.

Attention will now be directed to the flowchart 300 illustrated in FIG. 3, which shows one method for implementing the invention. As shown, the method includes identifying data to be stored (310). In this regard, the term data refers to the data types that are to be stored. This identification can occur when code that identifies the data types is presented to the durable storage modules (not shown) that are maintained on computer readable media.

Next, a determination is made regarding what data base schema (e.g., database structures) should be used to store the data (320). This determination is made automatically in response to identifying the adornments associated with the data types, as described above. In particular, it is not necessary for a programmer to have any special understanding regarding what data structures should be created or how they should be selected or created using a database storage tool. Instead, the present invention provides for the automatic creation of data structures based on the adornments associated with the data types defined in the code, wherein the adornments reflect an intended use or access of the data.

Next, it is determined if the appropriate database structures exist (330). If not, they are created (340). For example, FIGS.

1 and 2 show certain embodiments of tables that can be created. These tables, however, should not be construed as limiting the scope of the invention. The creation of the database structure (340) can A includes creating a database table and populating the table with at least some columns identified by corresponding fields in the code, as described and shown above in reference to FIGS. 1 and 2.

Creating the database structures (340) can also include the creation of multiple tables corresponding to the data type. The tables that can be created can include, for example, a type table that defines the types identified in the code and that identifies each of the corresponding database tables. This table and other similar tables are described in more detail below. Any number of base class and sub-class tables can also be created upon determining a suitable database structure does not exist to store the data type.

After the appropriate database structures (e.g., tables) are created, the illustrated method of FIG. 3 includes obtaining the data objects to be stored (350). This can be accomplished, for example, during a single instance or over a period of time and from any number of connected or disparate databases and applications. Once the data objects are obtained (350), it is determined whether the data objects have already been stored (360). This can be accomplished, for example, by checking the appropriate tables, particularly when one of the corresponding fields has been adorned with a [CLSIIdentity] attribute, which indicates that no two entries will be the same unless they have the same value for the attributed field/s. Accordingly, if another entry has the same value in the corresponding adorned field/s, it can be determined that the entry has already been received and the new data is either a duplicate or update to the already received one. By reducing the duplicate entry of data objects, the storage capacity and query processing requirements can be minimized.

In one embodiment, the identity attribute is applied on fields to indicate if the field is part of the primary key. According to this embodiment, the identity attribute is applied to at least one field in a class that forms a root of a hierarchy of durable classes so that at least one field is used to identify the primary key which can be used, as described above, to avoid duplicate storage.

The next element of the illustrated method includes writing the data objects if they have not yet been written (370). This may include writing any portion of the data objects to one or more of the database tables, as shown above, or in any other manner. This may also include writing derivatives of the data objects to the database tables. This can also include writing pointers to the databases tables that point to the actual data stored in another location.

In other embodiments, the methods of the invention can also include modifying data (380) that is already found to be stored in the database structures. For example, if updates have been made to data since the last time it was stored, it can be useful to update the data. To avoid the updated data from being stored separately and independently from the older data, and thereby using valuable storage space, the primary keys can be used to determine that the data is the same and should be modified or overwritten. Otherwise, the record will yield stale information when it is later retrieved back into an object. The use of a unique key to prevent duplicate storage is also beneficial to avoid yielding different sets of information for the same entity in response to requests for the data.

Although the foregoing examples are provided with reference to database structures comprising database tables, it will be appreciated that the scope of the invention also extends to other embodiments, such as embodiments in which the database structures comprise XML files or other storage structures.

The scope of the invention also extends to embodiments in which the data store is an array or a dictionary. For example, an array can be configured similar to the collections described above, and herein, by providing two additional data elements or sets for different columns corresponding to the number of dimensions in the array and the rank of the dimensions.

In summary, the invention, which may be stored and implemented from one or more computer readable media having computer-executable instructions for implementing the methods described above, is sometimes referred to herein as a durable storage or durable storage for .NET data types and instances. As described, the durable storage offers a generic mechanism to serialize data structures into databases, thereby providing a solution for a number of services that need a generic way to store arbitrary data structures and retrieve them on demand.

Although the durable storage is based on the functionality provided by CLR (Common Language Runtime), it should be possible to plug in different data sources underneath the store. Also, the data model used by this invention based on .NET data types should not be viewed as constraining the scope of this invention as alternative data models such as those based on Java can be supported as well.

Some interesting variations and additional details regarding the invention will now be provided in the following description.

Initially, the durable storage framework can be described as consisting of the following elements: An ObjectStore that provides base functionality to serialize or deserialize a data structure to a data source. The ObjectStore can accept a context in which to operate. Derived forms of the ObjectStore provide specific implementation where the data source associated with the ObjectStore is a SQL database or an XML file. Classes related to the particular Store implementation for record id, store context etc. are also defined. Serialization attributes are also applied. A few custom attributes are defined, as described herein, so that service developers can specify some additional information on fields. A StoreService is a ServiceBus service that that provides a single point of contact to clients to persist objects in an underlying database.

The framework ensures that multiple references to the same object in a graph or a collection are stored only once. References to the same object across multiple graphs should also resolve to the same record in the store. To ensure this, classes need to specify fields that make up their unique id.

When deserialization happens and the object graph or collection is built from the stored record, every object should be created only once. But object references need not resolve to the same object across multiple deserialization calls unless they are specified to be belonging to the same context.

Attention is now directed specifically to the ObjectStore, which is the component that processes the store and retrieve requests. Exemplary methods and code corresponding to the ObjectStore will now be provided.

Constructor: ObjectStore is the starting point of the storage mechanism. The optional StoreContext parameter is used to set the stage for retrievals and stores. If no context is provided, the StoreContext is initialized with the default values.

Write: This method allows the caller to store an object o. The object o could be of a primitive type, struct, class or collection.

The Write method returns a unique RecordID if the object was stored. Otherwise it returns null or throws a StoreException exception.

Read: This method builds an object given a RecordID and the type of the object. An overloaded version returns a collection of objects based on specified criteria.

Delete: This method deletes an object given a RecordID and the type of the object. An overloaded version deletes objects based on specified criteria. A parameter indicates if references to other objects should be chased recursively. A cascade of delete operations may happen if the ref counts to the inner objects become 0 as a result of the deletion of the outer object.

Type Description:

```
abstract class ObjectStore
{
    ObjectStore( );
    ObjectStore(StoreContext context);
    RecordID Write(object o);
    object Read(Type t, RecordID id);
    object[ ] Read(Type t, Query criteria);
    bool Delete(Type t, RecordID id, bool recurse);
    bool Delete(Type t, Query criteria, bool recurse);
}
abstract class RecordID
{
}
abstract class StoreContext
{
}
class StoreException : Exception
{
}
```

Attention is now directed to some examples of the custom attributes, including serialization and referential action attributes. Exemplary code corresponding to some of the attributes will now be provided.

Serialization Attributes

SerializableAttribute and NonSerializableAttribute indicate if instances of a type can be serialized or not. Storeability and serializability are treated as related notions. Storeability is treated as serializing to a file or data store.

CLSIIdentityAttribute

As mentioned above, the CLSIIdentityAttribute is a custom attribute that is applied on fields to indicate if the field is part of the primary key. The CLSIIdentityAttribute must be applied to at least one field in the class that forms the root of a hierarchy of durable classes.

```
[AttributeUsage(AttributeTargets.Field)]
public sealed class CLSIIdentityAttribute : Attribute
{
}
```

ReferentialActionAttribute

ReferentialActionAttribute is a custom attribute that is applied on reference fields to indicate the action to be taken if the referred object is deleted.

```
[AttributeUsage(AttributeTargets.Field)]
public sealed class ReferentialActionAttribute : Attribute
{
    ReferentialActionAttribute(ReferentialAction a);
}
enum ReferentialAction
{
    NoAction, // referred object cannot be deleted until this object is deleted
    Cascade, // referred object will be deleted and this object is also deleted
    SetNull // referred object is deleted and reference is set to null
}
```

Other attributes were described above in reference to FIGS. 1 and 2 and the corresponding examples.

Attention will now be directed to the SqlStore, which is the component that processes store and retrieve requests to a SQL database. SqlStore establishes a database connection, translates the Read and Write calls to those understood by the DataAdapter etc. Exemplary methods and code corresponding to the SqlStore will now be provided.

Constructor: SqlStore is the starting point of the SQL storage mechanism. The optional StoreContext parameter is used to set the stage for retrievals and stores. If no context is provided, the StoreContext is initialized with the default values.

a) _database name: set to "ServiceBus"

b) _varMaxLength: set to 1024

Write: This method allows the caller to store an object o. The object o could be of a primitive type, struct, class or collection.

The Write method returns a unique SqlRecordID if the object was stored or is already present. Otherwise it returns null or throws a StoreException exception.

Read: This method builds an object given a RecordID.

VarMaxLength: This property gives the max length to be used while defining varchar and varbinary SQL types. Default value is 1024.

Type Description:

```
class SqlStore : ObjectStore
{
    SqlStore( );
    SqlStore(SqlStoreContext context);
    SqlDataAdapter DataAdapter {get;}
    SqlConnection DbConnection {get;}
    uint VarMaxLength {get; set;}
}
class SqlRecordID : RecordID
{
    int64 _ID;
}
class SqlStoreContext : StoreContext
{
    string _databaseName;
    IDataAdapter _dataAdapter;
    uint _varMaxLength;
}
class StoreException : Exception
{
}
```

Although the invention can be practiced in many different environments and with different relational databases, the following example illustrates some of the activities involved in storing an object in a SQL database. In particular, storing an object involves the following actions in a SQL database:

a) Creating a table: A SQL table that is equivalent to the object type is created if necessary. If not, the SQL table into which the object is to be stored is identified.

b) Once the SQL table corresponding to the object is available, the fields constituting the primary key are used to check if the object has already been stored in the table. If the row is already present, it is updated with the current object, else a new record is created.

c) The fields of the object instance that are serializable are stored. Based on the types of the object's members and recursively their members, more SQL tables are created if necessary.

Examples of different tables that can be created will now be presented.

ObjectTypeTable

ObjectTypeTable is a SQL table that maps the XmlTypeName of the CLR class/structure to the name of the data source table. For every SQL table that is created during the storing process, an entry is created in the ObjectTypeTable.

```
OBJECTTYPETABLE
(
objectTypeID SqlRecordID,
objectTypeName varchar(n),
sqlTableName varchar(128),
rootTypeID SqlRecordID,
baseTypeID SqlRecordID,
lastObjectID SqlRecordID
)
objectTypeID: unique id given to every type encountered.
``` objectTypeName: Fully qualified type name that can be used for lookups. The XmlTypeName instead of the AssemblyQualifiedName can be used so that a type with no field change across versions can resolve to the same data type name.

sqlTableName: Gives the name of the table corresponding to the CLR type.

rootTypeID: Gives the root of the durable class hierarchy. This root class must have primary keys specified by the user. The unique id is generated for every new row in this root table and will be reused in all the derived class tables along the class hierarchy chain.

baseTypeID: Gives the base class id. Will be null for the root of the durable class hierarchy.

lastObjectID: Gives the SqlRecordID of the last row added to the SQL table corresponding to this CLR type.

ObjectBaseTypeTable

ObjectBaseTypeTable is a SQL table that maintains the base class relationship of classes. For every SQL table that is created during the storing process, one or more entries are created in the ObjectBaseTypeTable. If type A is the base class of B, then the entry contains a row with A as source. This table is useful during queries.

```
enum Relationship
{
    Root=1, // source is the root class of dest
    Ancestor=2, // source is the non-immediate base class of dest
    Parent=3, // source is the immediate base class of dest
}
EXEC sp_addtype Relationship, tinyint, 'NOT NULL'
OBJECTBASETYPETABLE
(
srcObjectTypeID SqlRecordID,
destObjectTypeID SqlRecordID,
relationship Relationship,
)
srcObjectTypeID: type that is the source of the relationship.
destObjectTypeID: type that is the destination of the relationship.
relationship: relationship between source and destination.
```

ObjectArrayTable

ObjectArrayTable is a SQL table that contains the elements that make up any array. The elements of all array instances are stored here.

```
OBJECTARRAYTABLE
(
objCollectionID SqlRecordID,
elemIndex int,
elemObjID SqlRecordID,
elemTypeID SqlRecordID
)
objCollectionId: unique id given to every array instance encountered.
elemIndex: index of element within the array.
elemObjID: record id of the element object.
elemTypeID: Gives the type of the element object. This will help locate the table in which the element is stored.
```

ObjectDictionaryTable

ObjectDictionaryTable is a SQL table that contains the elements that make up any dictionary. The elements of all dictionary instances are stored here. Note that the actual key and the element objects are stored in the SQL tables corresponding to their CLR types.

```
OBJECTDICTIONARYTABLE
(
objCollectionID SqlRecordID,
elemKeyID SqlRecordID,
elemObjID SqlRecordID,
elemTypeID SqlRecordID
)
objCollectionID: unique id given to every dictionary instance encountered.
elemKeyID: record id of the key object.
elemObjID: record id of the element object.
elemTypeID: Gives the type of the element object. This will help locate the table in which the element is stored.
```

Attention will now be redirected to mapping of the CLR types. In particular, each class type is stored as a separate SQL table. The value of each field in an instance of the class is stored as column values in the SQL table.

The object table is the equivalent of a class or structure type and is created on the fly when the first object of that type is encountered. The instance type of the object is used, whenever available, otherwise the declared type of the object is used. E.g. if the object is null, the declared type is used.

A class subtype is translated into a SQL table containing the fields of the derived class with an extra SqlRecordId column that would refer to the SQL record corresponding to the root class instance value. The durable class chain is stored in the ObjectTypeTable.

The root table contains an extra column giving the actual instance type. The root object table will also contain two columns for the ref count. These will be useful during deletion and handle cyclic graphs as well. One ref count keeps track if the object was passed in as the root of an object graph (this count has only two values 0 or 1), another ref count maintains the total number of objects referencing this object. A row will be deleted only if both the ref counts become zero.

The primary key type of the table is determined from the object type's custom attributes. The custom attribute specifying the primary key can be set for one or more fields of the type. The root durable class must contain at least one field that has this attribute. The Sqlstore also adds the SqlRecordId column to the table definition that will contain a unique id that is automatically generated. This id is a 64-bit number, unique within the SQL table and will be defined as the alternate key. The SqlRecordId will always be used as the foreign key in inner objects that reference this object, even in cases where a primary key has explicitly been specified.

All the fields making up the primary key must be serializable members of the root durable class. Otherwise, to check if an object has already been stored, the SqlRecordId of reference fields in the primary key should first be obtained. Note that this is a recursive process, since the reference fields could themselves contain reference fields in their primary keys. The following paragraph provides an example of this.

```
e.g. class Media
{
    [uniqueKey]
    MediaId id;
    [uniqueKey]
    string location;
    string artist;
}
class MediaId
{
    string libId;
    int objId;
}
Media a;
```

Here to find if object "a" has already been persisted, we need to query the MediaId table for the SqlRecordId corresponding to a.id. Once we have this, we can query the Media table for the primary key given by the SqlRecordId and the location values.

A class that has no fields is translated to a SQL table with a single column that is the SqlRecordId. Examples will now be provided.

```
<ROOT TABLENAME>
(
objID SqlRecordID UNIQUE,
objectTypeID SqlRecordID REFERENCES
OBJECTTYPETABLE(objectTypeID),
refCount int,
rootRefCount bit,
```

-continued

```
<field> <type>,
<field> <type>,
<field> SqlRecordID REFERENCES <REF ROOT
TABLENAME>(objID),
...
CONSTRAINT PK_<ROOT TABLENAME> PRIMARY KEY (<field>,
<field>...)
)
<DERIVED TABLENAME>
(
objID SqlRecordID REFERENCES <ROOT TABLENAME>(objID)
<field> <type>,
<field> <type>,
<field> SqlRecordID REFERENCES <REF ROOT
TABLENAME>(objID),
...
)
e.g.
class A
{
    ...
}
[Serializable]
class B : A
{
    [UniqueKey]
        int fb1;
    [UniqueKey]
        int fb2;
        int fb3;
}
[Serializable]
class C : B
{
    int fc1;
}
```

The following SQL tables are created:

```
BTABLE
(
objID SqlRecordId UNIQUE,
objectTypeID SqlRecordID REFERENCES
OBJECTTYPETABLE(objectTypeID),
refCount int,
rootRefCount bit,
fb1 int,
fb2 int,
fb3 int,
CONSTRAINT PK_BTABLE PRIMARY KEY (fb1, fb2)
)
CTABLE
(
objID SqlRecordId REFERENCES BTABLE(objID),
fc1 int
)
Given
B b = new B;
C c = new C;
```

Suppose objID of b is 1 and objID of c is 2. Then a row with id 1 will appear in the BTABLE, while a row with id 2 will appear in BTABLE and CTABLE.

A class member that is typed as a class type will translate to a SqlRecordId column in the SQL table created for the enclosing class. A foreign key constraint is imposed on this column. This is possible even though instances of the subtypes of the inner class type may also be present in the enclosing class instance, since all ids are unique at the root class level. The refCount and rootRefCount columns of the row referred to is appropriately maintained.

A class member is nullable if it is of a class type and is not part of the primary key. Members that are of primitive types and structs are non-nullable. In the SQL table definition, nullable fields are specified as nullable.

When class instances A and B contain references to each other in an object graph, A and B are stored only once. A and B would contain the SqlRecordId of each other. An example follows:

```
[Serializable]
class A
{
    [UniqueKey]
        int fa1;
        int fa2;
        X fa3;
}
[Serializable]
class X
{
    [UniqueKey]
        int fx1;
}
```

The following SQL tables are created:

```
ATABLE
(
objID SqlRecordId UNIQUE,
objectTypeID SqlRecordID REFERENCES
OBJECTTYPETABLE(objectTypeID),
fa1 int NOT NULL,
fa2 int NOT NULL,
fa3 SqlRecordId REFERENCES XTABLE(objID) NULL,
CONSTRAINT PK__BTABLE PRIMARY KEY (fa1)
)
XTABLE
(
objID SqlRecordId UNIQUE,
fx1 int
CONSTRAINT PK__BTABLE PRIMARY KEY (fx1)
)
```

In one embodiment, a structure type is translated as a separate table with fields. Though a CLR structure is a value type, an independent table is created to optimize the case of multiple references to a boxed structure. Structures are treated exactly like classes that have no inheritance chain.

The value of each field in a structure instance is stored as column values in the table. A class or structure member that has a structure type will translate to a SqlRecordId column in the SQL table created for the class.

In a second embodiment, members of a class member typed as a structure type are stored in the same table created for the enclosing class with the column names that correspond to the members of the structure type prefixed with the class member name typed as a structure type in the enclosing class.

In a third embodiment, members of a class member typed as a structure type are stored as a User Defined Type (UDT) in the table created for the enclosing class.

An object that has a primitive type is translated as a primitive type table. A primitive type table contains two columns—a SqlRecordId column and a column for the primitive type. According to one embodiment, selective retrieval and deletion of objects of primitive types is not supported.

A class or structure member that has a primitive type is translated as a column in a SQL table, as follows. The value in the column is the value of the primitive type.

| CLR Type | SQL Type |
| --- | --- |
| System.Data.SqlTypes.SqlBinary | varbinary(1024). If specified, VarMaxLength is used instead of 1024. |
| System.Data.SqlTypes.SqlDateTime | Datetime |
| System.Data.SqlTypes.SqlDecimal | Decimal |
| System.Data.SqlTypes.SqlDouble | Float |
| System.Data.SqlTypes.SqlGuid | Uniqueidentifier |
| System.Data.SqlTypes.SqlInt16 | Smallint |
| System.Data.SqlTypes.SqlInt32 | Int |
| System.Data.SqlTypes.SqlInt64 | Bigint |
| System.Data.SqlTypes.SqlMoney | Money |
| System.Data.SqlTypes.SqlSingle | Real |
| System.Data.SqlTypes.SqlString | varchar(1024). If specified, VarMaxLength is used instead of 1024. |
| System.Char | Char |
| System.Double | Float |
| System.Guid | Uniqueidentifier |
| System.Int16 | Smallint |
| System.Int32 | Int |
| System.Int64 | BigInt |
| System.Single | Real |
| System.String | varchar(1024). If specified, VarMaxLength is used instead of 1024. |
| System.UInt16 | Int |
| System.UInt32 | BigInt |
| System.UInt64 | binary(8) |

An array is issued a unique SqlRecordId and is stored in the ObjectArrayTable as multiple rows corresponding to its elements. Each row in this table will contain the SqlRecordId of the array instance and the element index. The actual elements are stored in the tables corresponding to their instance types. If the array is a member of a class, then the SqlRecordId of the array is stored in the enclosing class.

ArrayList, Queue: These are treated identical to arrays and stored in the ObjectArrayTable.

HashTable: These are treated similar to arrays, but are stored in the ObjectDictionaryTable. Each row in this table will contain the SqlRecordId of the element instance and the element key.

Object Retrieval And Querying

An object can be retrieved in two ways: (1) using its Sql-RecordID and type; and (2) using selection criteria and type. The type can be any type in the persistence class hierarchy from the root to the actual type of the object. If a SqlRecordID is specified and the type is not a collection, the following steps can be performed to retrieve it:

a) Look up the ObjectTypeTable and obtain the root table name for the type.
b) Obtain the actual type of the object.
c) Obtain the table name for the instance from the ObjectTypeTable.
d) Obtain the row from the SQL table.
e) Obtain the fully qualified name of the CLR type from the table name.
f) Create an object of the obtained CLR type using the default constructor (a persistable object is expected to have a default constructor).
g) If CLR type is a primitive type, assign value directly.
h) If CLR type is a class or a struct, assign the fields of the object with the fields of the row. For primitive fields assign directly; for other fields recursively follow the record id and retrieve the referenced object. Note that the referenced object may itself be a class, struct or collection.
  i) Keep track that an object is created only once while deserializing an object graph.

If a SqlRecordID is specified and the type is a collection, the following steps can be implemented to retrieve it:
  a) Obtain the number of rows in the relevant collection table with the specified id as the collection id. Create as many elements in the collection as there are rows.
  b) Follow object retrieval rules for each element recursively.

Retrieving objects given a query can be more complex and can include:
  a) Follow query translation rules and translate Query to SQL.
  b) Execute query and obtain matching rows in the type's SQL table.
  c) Follow object retrieval rules for each row.

An object can be deleted in two ways: (1) using its SqlRecordID and type and (2) using selection criteria and type. The type can be any type in the persistence class hierarchy from the root to the actual type of the object. If a SqlRecordID is specified and the type is not a collection, the following steps can be performed to delete it:
  a) Obtain the root table id from the object type.
  b) Obtain the row in the root table. Decrement the root ref count.
  c) Obtain the actual object type. Follow the hierarchy chain and go through the fields of each row corresponding to the object, and obtain the record ids of non-primitive fields.
  d) For each of the non-primitive fields, obtain the referenced table id. Decrement the reachable ref count of the referenced row. Recursively, traverse the inner non-primitive fields and apply the same rules. Delete the referenced row if both the ref counts drop to 0.
  e) Delete the original row if both its root ref count and reachable ref count are 0.

Steps c, d should be done only if the recurse parameter is set to true. If a SqlRecordID is specified and the type is a collection, the following steps can be implemented to delete it:
  a) Obtain the rows in the relevant collection table with the specified id as the collection id.
  b) Follow object deletion rules for each element recursively.

Deleting objects given a query can be more complex and can involve the following:
  a) Follow query translation rules and translate Query to SQL.
  b) Execute query and obtain matching rows in the type's SQL table.
  c) Follow object deletion rules for each row.

Based on the foregoing, it will also be appreciated that various types of queries can also be performed on the data stored in the database structures and tables described above. Some non-limiting examples of queries that can be performed on the examples described in reference to FIGS. 1 and 2 will now be provided. For example, to retrieve purchase orders of customers living in zip code 98074, an XPATH query could look something like the following: /Customers[typeof(address)=USAddress && address.zip=98074]/orders. Likewise, to retrieve addresses of customers who have at least one purchase order outstanding, an XPATH query would look like the following: /Customers[Count(orders)>0]/address. Similarly, to retrieve "Sting" albums with at least one song, an XPATH query would look something like the following: /Albums[Exists(artists, name="Sting") && count(songs)>0]. To retrieve songs of the album titled Groovy, an XPATH query would look something like the following: /Albums[title="Groovy"]/songs. Finally, to retrieve albums containing the song titled "Whenever," an XPATH query would look something like the following: /Songs[title="Whenever"]/album.

Notwithstanding the foregoing implementation details and examples that have been provided herein, it will be appreciated that the scope of the present invention broadly extends to any method, system or computer program product in which tables or other data structures are created in response to attributes and other adornments that are associated with the objects and fields of classes and data types to be stored. Such a method for creating a database mechanism for storing data does not rely on the expertise of the programmer with regard to databases, but rather only on the knowledge of intended use for the data. This represents an improvement over prior art systems, such as Access and other database tools that require the programmer to understand how they want the database to be structured.

The present invention also enables the database mechanism to be scalable and interoperable with various different data formats and relational database systems. Accordingly, it will be appreciated that the invention can be practiced in various computing environments. One example of a suitable computing environment in which the invention can be practiced now follows.

Computing Environment

The methods that have been described above can be performed with the use of any number of computing modules and systems and network computing environments with various configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 4:
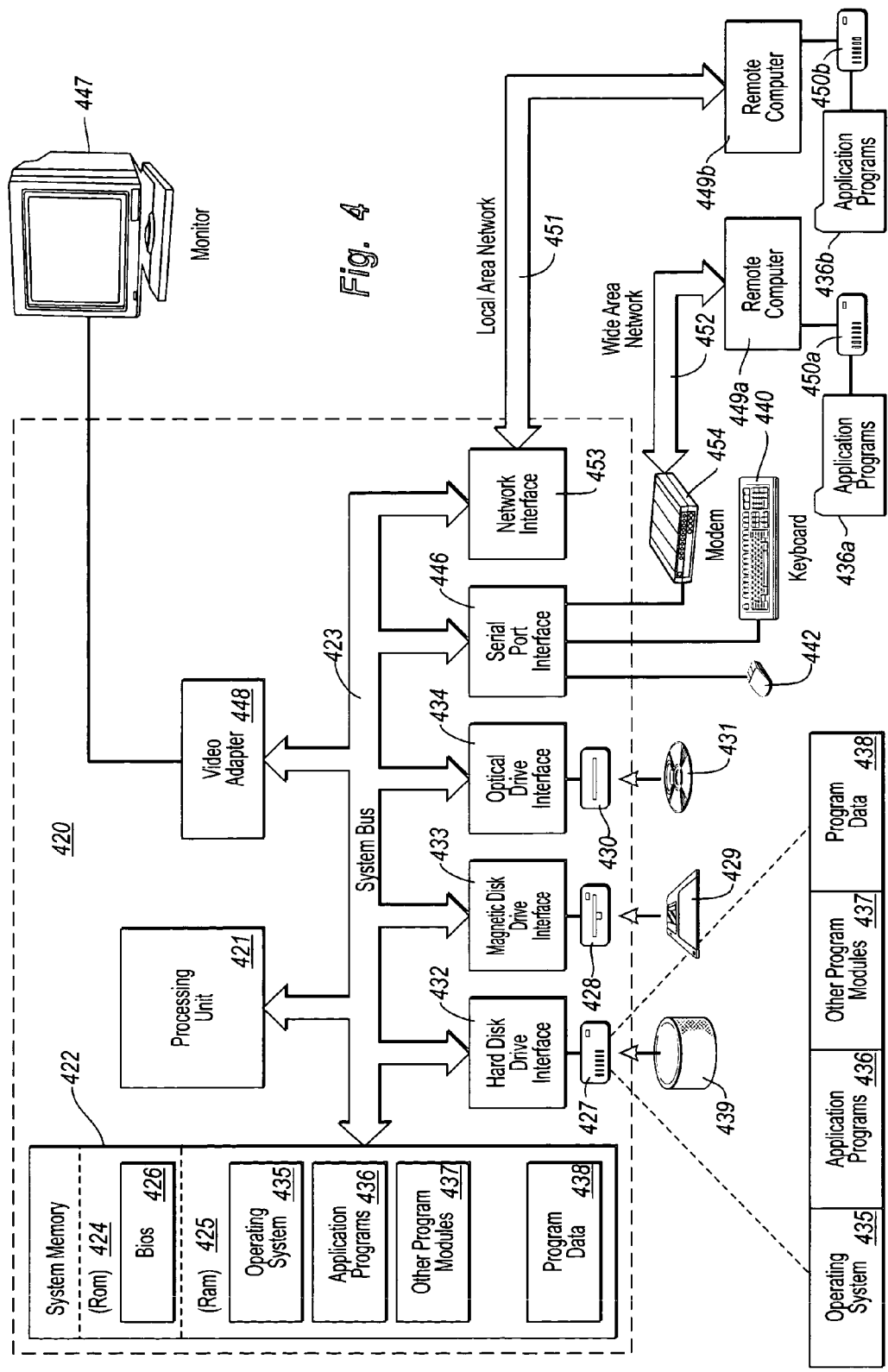
FIG. 4 illustrates one embodiment of a suitable computing environment in which methods of the invention can be practiced.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM, DVD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for dynamically determining a database structure and creating a data store for storing objects of one or more data types in accordance with the determined database structure, the method comprising:

receiving a programming code segment comprising a definition of the one or more data types and at least one adornment associated in the code segment with at least one of the one or more data types, the at least one adornment reflecting an intended use or access of the associated data type;

identifying at least one adornment defined within the programming code segment and associated with at least one of the data types, the at least one adornment comprising identity attribute applied to at least one field in a class which forms a root of a hierarchy and which indicates that the data type should represent a unique key within the database, and an index attribute indicating that the associated data type should be able to be queried, a back pointer attribute indicating that a one-to-many relationship exists between an indicated second data type and the data type, and a single reference attribute indicating a one-to-one relationship exists between instances of the data type and an indicated second data type;

based on each of the definitions of the one or more data types and the at least one adornment, determining a database structure to be used to store data corresponding to the one or more data types, the database structure comprising a type table defining at least one of the one or more types identified in the code segment;

determining if appropriate the determined database structures exist; and creating a data store corresponding to the determined database structure, the data store comprising an ObjectStore that provides base functionality to serialize and deserialize a data structure to a data source, and a StoreService which is a ServiceBus service providing a single point of contact to clients to persist objects in the data store.

2. A method as recited in claim 1, wherein the data store is created without receiving specific input defining the data store other than the adornments and definitions of the one or more data types.

3. A method as recited in claim 1, wherein determining a database structure includes determining a structure that will optimize querying of the data type and data stored within the data store.

4. A method as recited in claim 1, wherein creating the data store comprises creating one or more database tables.

5. A method as recited in claim 4, wherein creating the one or more database tables includes populating the one or more database tables with at least some fields identified by corresponding fields in the code.

6. A method as recited in claim 4, wherein creating the one or more database tables includes creating a base class database table and at least one sub-class database table that is cross-referenced with the base class database table.

7. A method as recited in claim 4, further comprising: creating a type table that defines the types identified in the code and that identifies each of the corresponding database tables.

8. A method as recited in claim 1, wherein creating the data store comprises creating one or more XML files.

9. A method as recited in claim 1, wherein a different database table is created for every type defined in the code.

10. A method as recited in claim 1, wherein the at least one adornment includes an attribute that specifies that a field of the at least one data type should be indexed.

11. A method as recited in claim 1, wherein the at least one adornment includes an attribute that specifies that one or more fields of the at least one data type should be a unique key for the type.

12. A method as recited in claim 1, wherein the at least one adornment includes an attribute that specifies a one to one relationship.

13. A method as recited in claim 1, wherein the at least one adornment includes an attribute that specifies that a field of the at least one data type should be a back pointer to objects in another data structure.

14. A method as recited in claim 1, wherein at least one field defined in the code corresponding to the at least data type is unadorned and wherein the absence of an adornment indicates that a one to many relationship should exist.

15. A method as recited in claim 1, wherein the data store comprises one of a dictionary, a collection and an array.

16. A method for dynamically determining a database structure and creating a data store for storing objects of one or more data types and for storing data corresponding to the objects, the method comprising the method of claim 1 and further comprising:
receiving data to be stored in the data store;
determining whether the data is already stored including checking appropriate tables and checking each field which is adorned with an identity attribute;
upon determining that the data is not already stored, storing the data in the structure according to the adornments and descriptions provided in the code and the determined database structure; and
upon determining that the data is already stored, determining pointers to the already stored data and writing the pointers to point to data stored in another location.

17. A method as recited in claim 16, wherein the data store is created without receiving specific input defining the data structure other than the adornments and definitions of the one or more data types.

18. A method as recited in claim 16, wherein determining that the data is not already stored includes checking a unique identity field defined by the adornments within the data and making sure that said unique identify field within the data does not already exist within the data structure.

19. A method as recited in claim 16, wherein determining a structure to be used includes determining a schema that will optimize querying of the data type and data stored within the data structure.

20. A method as recited in claim 16, wherein the data structure corresponding to the data types comprises one or more database tables.

21. A method as recited in claim 20, wherein storing the data in the database table includes populating the table with at least some of the data and in such a way as to optimize querying of the data at a later time.

22. A method as recited in claim 16, wherein upon determining that the data is already stored, the method further includes modifying the data.

23. A computer program product comprising one or more computer-readable storage media having computer-executable instructions that, when executed by a computing system, implement the method recited in claim 1.

24. A computer program product as recited in claim 23, wherein the data structure is created without receiving specific input defining the data store other than the adornments and definitions of the one or more data types.

25. A computer program product as recited in claim 23, wherein determining a data structure to be used includes determining a schema that will optimize querying of the data type and data stored within the data store.

26. A computer program product as recited in claim 23, wherein creating the data store comprises creating one or more database tables.

27. A computer program product as recited in claim 26, wherein creating the database table includes populating the table with at least some fields identified by corresponding fields in the code.

28. A computer program product as recited in claim 26, wherein creating the one or more database tables includes creating a base class database table and at least one sub-class database table that is cross-referenced with the base class database table.

29. A computer program product as recited in claim 23, wherein the method further comprises: creating a type table that defines the types identified in the code and that identifies each of a plurality of corresponding database tables.

30. A computer program product as recited in claim 23, wherein a different database table is created for every type defined in the code.

31. A computer program product as recited in claim 23, wherein the at least one adornment includes an attribute that specifies that a field of the at least one data type should be indexed.

32. A computer program product as recited in claim 23, wherein the at least one adornment includes an attribute that specifies that a field of the at least one data type should be a unique key for the type.

33. A computer program product as recited in claim 23, wherein the at least one adornment includes an attribute that specifies that a one to one relationship.

34. A computer program product as recited in claim 23, wherein the at least one adornment includes an attribute that specifies that a field of the at least one data type should be a back pointer to objects in another data structure.

35. A computer program product as recited in claim 23, wherein at least one field defined in the code corresponding to the at least data type is unadorned and wherein the absence of an adornment indicates that a many to one relationship should exist.

36. A computer program product as recited in claim 23, wherein creating the data store comprises creating one or more XML files.

37. A computer program product as recited in claim 23, wherein the data store comprises one of a dictionary, a collection and an array.

38. A computer program product comprising one or more computer-readable storage media having computer-executable instructions that, when executed by a computing system, implement the method recited in claim 16.

39. A computer program product as recited in claim 38, wherein the one or more data structures is created without receiving specific input defining the one or more data structures other than the adornments and definitions of the one or more data types.

40. A computer program product as recited in claim 38, wherein determining that the data is not already stored includes checking a unique identity field defined by the adornments within the data and making sure that said unique identify field within the data does not already exist within the one or more data structures.

41. A computer program product as recited in claim 38, wherein determining whether the one or more data structures exist includes determining a data structure that will optimize querying of the data type and data stored.

42. A computer program product as recited in claim 38, wherein the data structure comprises one or more database tables.

43. A computer program product as recited in claim 42, wherein storing the data in the one or more database tables comprises mapping each CLR class type so that each CLR class is stored in a separate SQL type table and each field in an instance of a class is stored as a column value in an SQL table.

44. A computer program product as recited in claim 38, wherein the attributes further comprise SerializableAttribute, CLSIdentityAttribute, ReferentialActionAttribute;

wherein the ObjectStore further comprises classes SqlStore, SqlStoreContext, and StoreException; and wherein type tables comprise ObjectTypeTable, ObjectBaseTypeTable, ObjectArrayTable, and ObjectDictionaryTable.

\* \* \* \* \*